(12) United States Patent
Landais et al.

(10) Patent No.: US 10,681,636 B2
(45) Date of Patent: *Jun. 9, 2020

(54) OPTIMIZATION OF NETWORK SIGNALING LOAD AND/OR OF USER EQUIPMENT POWER CONSUMPTION IN A PACKET MOBILE SYSTEM

(71) Applicant: Nokia Technologies Oy, Espoo (FI)

(72) Inventors: Bruno Landais, Lannion (FR); Alessio Casati, Swindon (GB)

(73) Assignee: Nokia Technologies Oy, Espoo (FI)

( * ) Notice: Subject to any disclaimer, the term of this patent is extended or adjusted under 35 U.S.C. 154(b) by 0 days.

This patent is subject to a terminal disclaimer.

(21) Appl. No.: 15/831,468

(22) Filed: Dec. 5, 2017

(65) Prior Publication Data

US 2018/0098281 A1  Apr. 5, 2018

Related U.S. Application Data

(63) Continuation of application No. 14/439,139, filed as application No. PCT/EP2013/072431 on Oct. 25, 2013, now Pat. No. 9,854,523.

(30) Foreign Application Priority Data

Oct. 29, 2012  (EP) ..................................... 12306347

(51) Int. Cl.
*H04W 52/02* (2009.01)
*H04W 76/27* (2018.01)
*H04W 76/28* (2018.01)

(52) U.S. Cl.
CPC ... *H04W 52/0222* (2013.01); *H04W 52/0258* (2013.01); *H04W 76/27* (2018.02);
(Continued)

(58) Field of Classification Search
CPC ......... H04L 47/10; H04L 47/11; H04L 47/12; H04L 47/13; H04W 84/12; H04W 84/13; H04W 84/14; H04W 84/15
(Continued)

(56) References Cited

U.S. PATENT DOCUMENTS 7,436,779 B1  10/2008  Mangal et al.
8,238,260 B2  8/2012  Terry et al.
(Continued)

FOREIGN PATENT DOCUMENTS

JP  2009-531891  9/2009
JP  2010-530648  9/2010
(Continued)

OTHER PUBLICATIONS

International Search Report for PCT/EP2013/072431 dated Nov. 22, 2013.

*Primary Examiner* — Dady Chery
(74) *Attorney, Agent, or Firm* — Fay Sharpe LLP

(57) ABSTRACT

In an embodiment, there is provided a method for optimization of network signalling load and/or User Equipment power consumption in a packet mobile system wherein an User Equipment UE has access to a network comprising a Core Network CN accessed by a Radio Access Network RAN, a method wherein CN assistance information is provided by said CN to said RAN for an UE, said CN assistance information including information determined in said CN based on a learning by said CN of a traffic pattern and/or a mobility pattern of said UE, and said CN assistance information is used in said RAN to adjust RAN parameters enabling to control transitions between idle and connected state and/or power consumption in connected state for said UE.

20 Claims, 3 Drawing Sheets

(52) U.S. Cl.
CPC .............. *H04W 76/28* (2018.02); *Y02D 70/00* (2018.01); *Y02D 70/122* (2018.01); *Y02D 70/1242* (2018.01); *Y02D 70/21* (2018.01); *Y02D 70/24* (2018.01)

(58) Field of Classification Search
USPC ....... 370/332, 338, 229, 230, 348, 389, 401, 370/477; 455/458, 552.1, 343.1–343.4, 455/445–454
See application file for complete search history.

(56) References Cited

U.S. PATENT DOCUMENTS

| | | |
|---|---|---|
| 8,423,093 B2 | 4/2013 | Ren |
| 2004/0248577 A1 | 12/2004 | Sayeedi |
| 2007/0259673 A1 | 11/2007 | Willars et al. |
| 2009/0088134 A1 | 4/2009 | Ishii et al. |
| 2011/0019602 A1 | 1/2011 | Park et al. |
| 2012/0120828 A1 | 5/2012 | Anderson et al. |
| 2012/0207069 A1 | 8/2012 | Xu et al. |
| 2012/0276904 A1 | 11/2012 | Bachmann |
| 2013/0273900 A1 | 10/2013 | Iwai et al. |
| 2014/0334369 A1* | 11/2014 | Kaikkonen ....... H04W 52/0216 370/311 |
| 2015/0173013 A1 | 6/2015 | Iwai et al. |
| 2016/0029433 A1 | 1/2016 | Jeong et al. |

FOREIGN PATENT DOCUMENTS

| | | |
|---|---|---|
| JP | 2013-524645 | 6/2013 |
| JP | 2013-526087 | 6/2013 |
| KR | 10-2009-0115180 | 11/2009 |
| KR | 10-2011-0000479 | 1/2011 |
| KR | 10-2011-0081724 | 7/2011 |
| WO | WO 2007/023812 | 3/2007 |
| WO | WO 2011/123744 | 10/2011 |
| WO | WO 2011/129070 | 10/2011 |
| WO | WO 2012/093434 | 7/2012 |
| WO | WO 2014/006815 | 1/2014 |

* cited by examiner

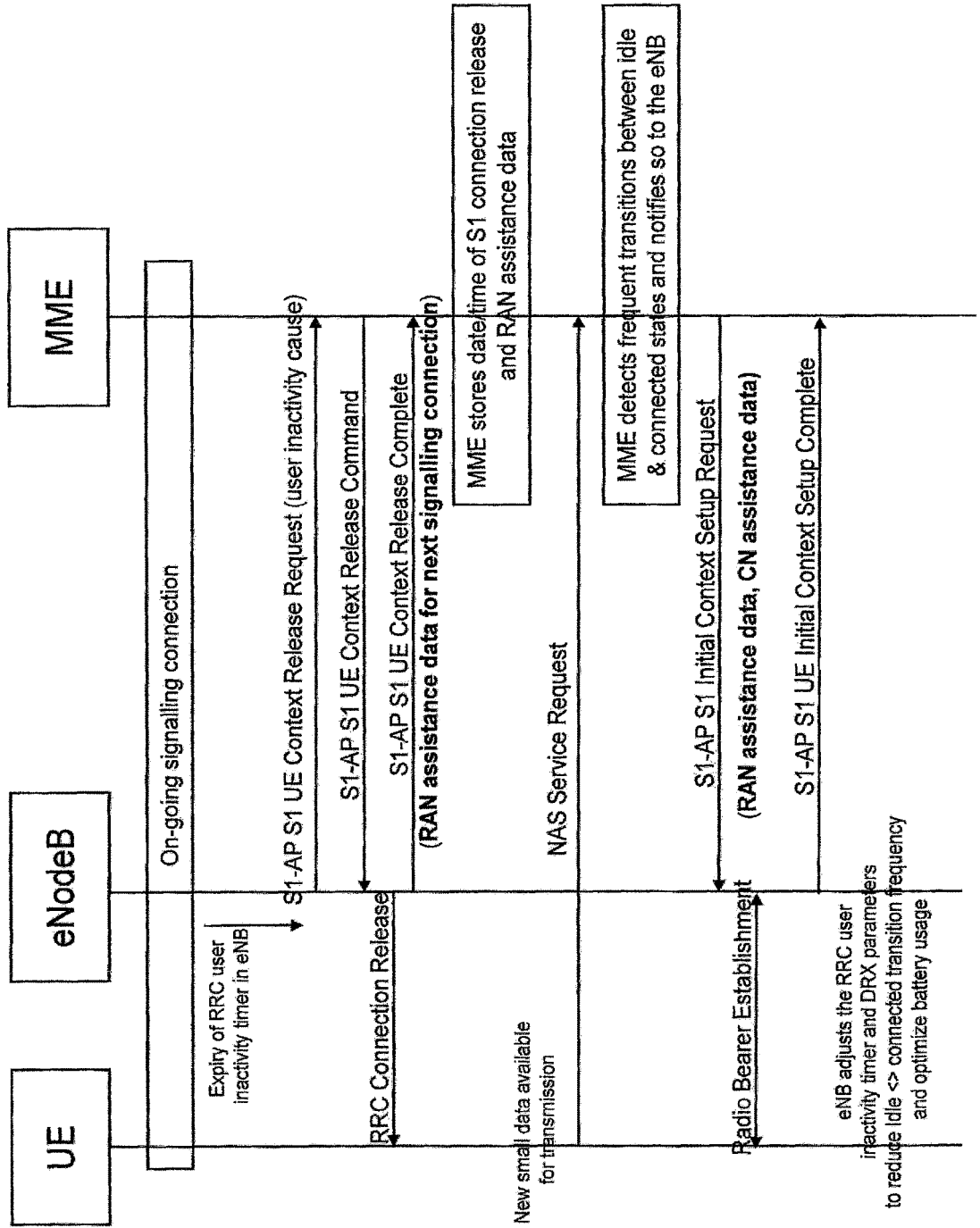

OPTIMIZATION OF NETWORK SIGNALING LOAD AND/OR OF USER EQUIPMENT POWER CONSUMPTION IN A PACKET MOBILE SYSTEM

The present invention generally relates to mobile communication networks and systems.

Detailed descriptions of mobile communication networks and systems can be found in the literature, such as in particular in Technical Specifications published by standardization bodies such as for example 3GPP (3$^{rd}$ Generation Partnership Project).

In general, in such systems, an User Equipment (UE) has access to a mobile network comprising a Core Network (CN) accessed by a Radio Access Network (RAN).

Examples of packet mobile communication systems include EPS (Evolved Packet System), UMTS, . . . etc.

EPS network, for example, comprises a Core Network called EPC (Evolved Packet Core) that can be accessed by a Radio Access Network called E-UTRAN. An example of architecture of EPS network is recalled in FIG. 1 (taken from 3GPP TS 23.401), showing the main network nodes and interfaces between network nodes. Interfaces between EPS network nodes include, in particular, Uu interface between UE and E-UTRAN node called eNodeB (eNB), and S1-MME interface between eNB and EPC node called Mobility Management Entity (MME).

Control plane signaling may be exchanged on the Uu interface between UE and eNB, and on the S1-MME interface between eNB and MME, during signaling procedures. Signaling procedures include, in particular, signaling procedures performed at UE state transition (such as service request procedure performed at transition from idle to connected state, or signaling connection release procedures performed at transition from connected to idle state), mobility procedures (such as handover procedure performed in UE connected state, or Tracking Area Update procedure performed in UE idle state). An UE may transition from connected state to idle state if there is not enough UE activity in the user plane, or from idle to connected state if there is again UE activity in the user plane. RRC signaling protocol between UE and eNB is defined in particular in 3GPP 36.331. S1-AP signaling protocol between eNB and MME is defined in particular in 3GPP TS 36.413.

New types of communications, such as Machine Type Communication (MTC) or other mobile data applications communications (e.g. Instant Messaging IM, social networking applications, . . . etc.) are becoming increasingly used. Such new types of communications have new service requirements, such as frequent small data transmission, frequent UE state transitions, . . . etc. New functionalities are therefore needed for the support of such new service requirements, such as functionalities to efficiently support increased control plane signaling with minimal impact on the network and on the UE power consumption, . . . etc. More generally, network and system optimizations are needed for such new types of communications.

Embodiments of the present invention in particular address such needs.

These and other objects are achieved, in one aspect, by a method for optimization of network signalling load and/or User Equipment power consumption in a packet mobile system wherein an User Equipment UE has access to a network comprising a Core Network CN accessed by a Radio Access Network RAN, a method wherein CN assistance information is provided by said CN to said RAN for an UE, said CN assistance information including information determined in said CN based on a learning by said CN of a traffic pattern and/or a mobility pattern of said UE, and said CN assistance information is used in said RAN to adjust RAN parameters enabling to control transitions between idle and connected state and/or power consumption in connected state for said UE.

These and other objects are achieved, in other aspects, by entities configured to carry out such method, said entities including, in particular (though not exclusively), RAN entity (such as eNB for E-UTRAN, or RNC for UMTS), CN entity in charge of control plane (such as MME for EPC, or SGSN for UMTS), CN entity in charge of user plane (such as Serving Gateway S-GW or PDN Gateway P-GW for EPC, or GGSN for UMTS).

Some embodiments of apparatus and/or methods in accordance with embodiments of the present invention are now described, by way of example only, and with reference to the accompanying drawings, in which:

FIG. 3 is intended to illustrate, in a simplified way, an example of procedure based on the use of CN assistance information according to embodiments of the present invention.

Embodiments of the present invention will be more detailed in the following, by way of example for 3GPP systems such as EPS. However it should be understood that the present invention is not limited to EPS, and could apply as well to systems other than EPS (for example UMTS, or systems specified by standardization bodies other than 3GPP).

3GPP SA2 is in the process of studying enhancements for machine-type and other mobile data applications communications (3GPP release 12, see 3GPP TR 23.887). Many mobile data applications (e.g. always on mobile data applications such as IM or social networking applications, etc.) are characterized in particular by transmission of small and bursty data packets (i.e. in terms of packet size) in the UL and DL, e.g.

status update messages to notify the users of status updates relating to the application, e.g. applications such as FindMe generate status update messages upon geographic position changes up to every 60 seconds;
 periodic keep-alive messages to keep the application session alive and also to avoid the expiry of NAT mapping which causes IP session disconnection,
 presence information of buddies in an IM buddy list,
 update of user location upon user "check in",
 update of "Facebook likes" to a user's friends, etc.

Figure 1:
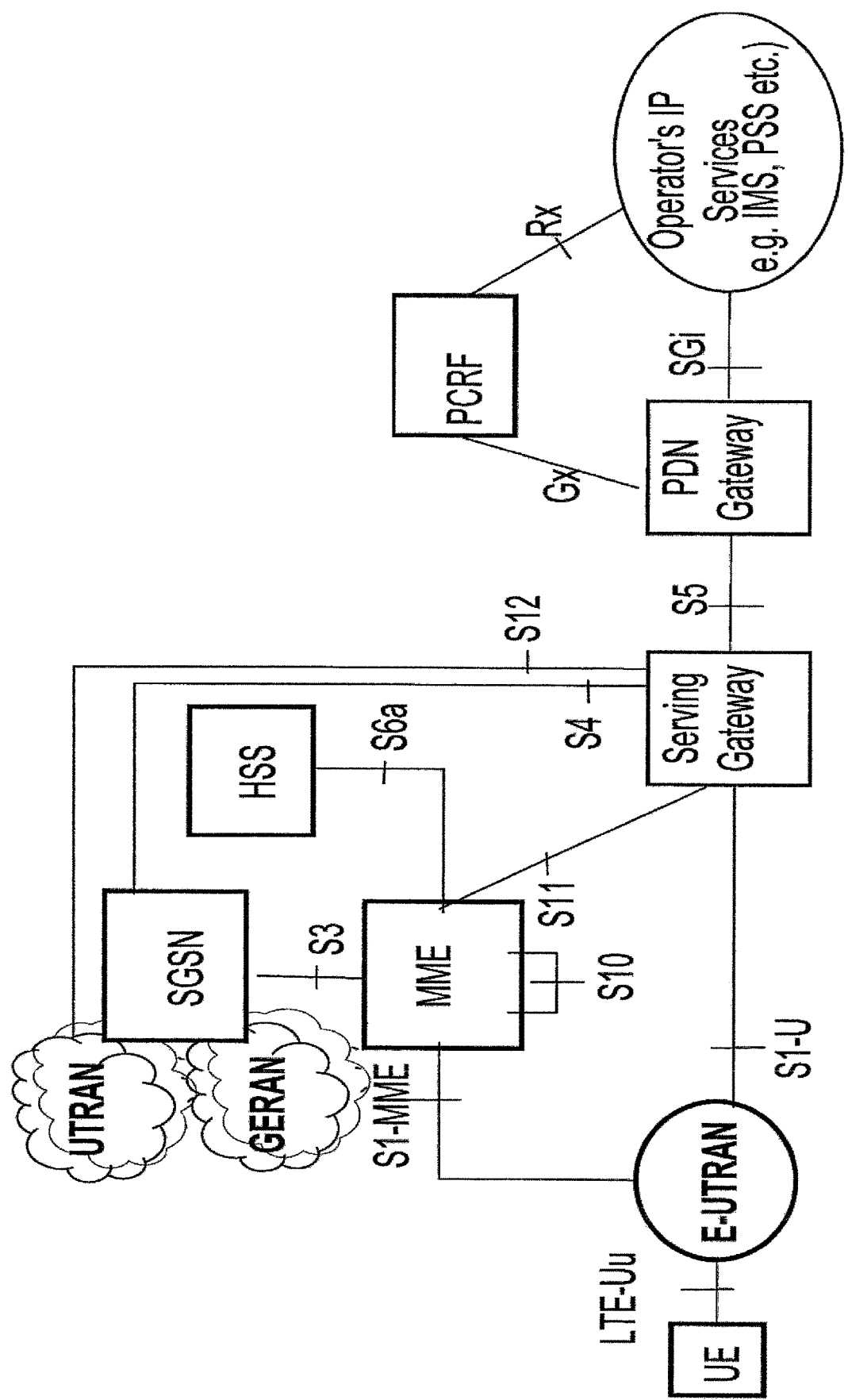
FIG. 1 is intended to recall an example of architecture for EPS network.
Figure 2:
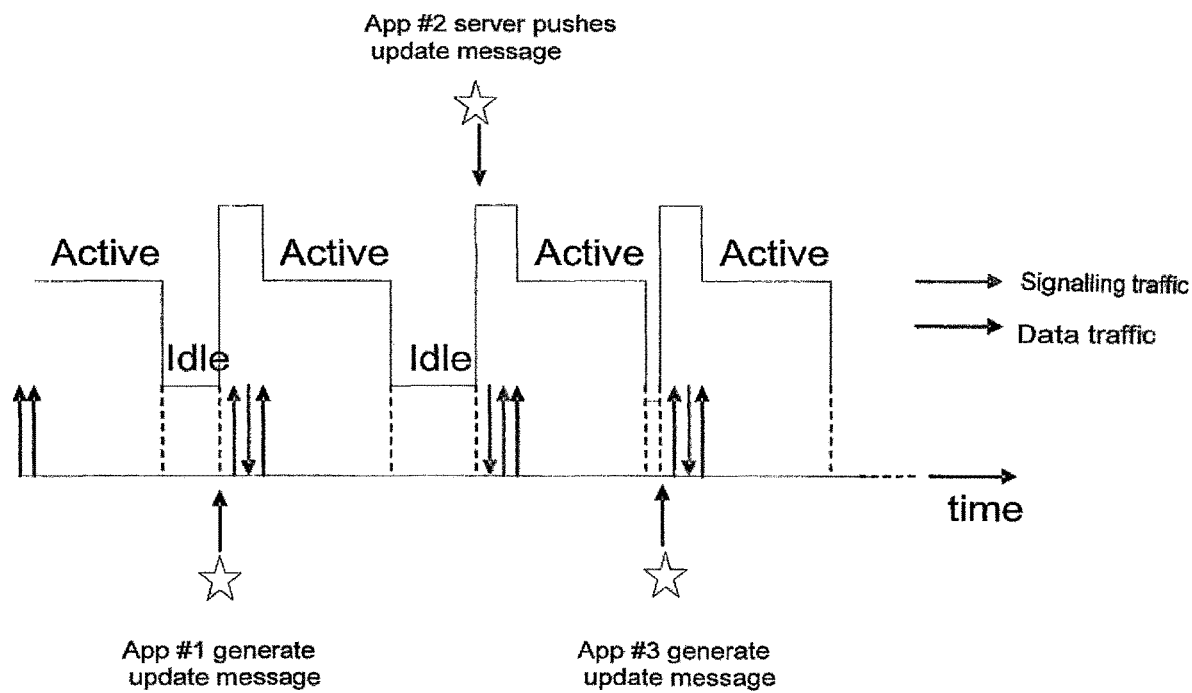
FIG. 2 is intended to recall an example of timing for an UE experiencing frequent idle-active mode transitions.

Bursty data transmission may cause the UE to transition frequently between idle and connected state, if the UE is sent to idle mode soon after the transmission of the data is complete. If the UE is kept in connected mode for an extended duration it has impact on UE power consumption and more extensive control plane signalling is required for handovers. This is depicted e.g. in FIG. 2 corresponding to FIG. 2 of 3GPP TR 22.801 (non-MTC Mobile Data Applications impacts) clause 5.2.

Such frequent transmissions can have the following adverse effects on the network and the UE:

Increased control plane signalling in RAN (Radio Access Network) and CN (Core Network);
 Increased UE power consumption.

RAN2 studies in 3GPP TR 36.862 analyse in particular the effects of the RRC inactivity release timer & the DRX (Discontinuous Reception) cycle on network signalling (transitions idle< >connected), handovers (extra handover signalling when keeping the UE in connected state for a longer RRC release timer, in particular for moving UEs), and UE power consumption, for different kinds of traffic. RAN2 also specified in Rel-11 (see 3GPP TS 36.300 and 36.331) a new UE assistance information procedure enabling the UE to indicate to the network a power preference indication, e.g. lower power consumption, to enable the eNB to optimize the setting of the DRX parameter & RRC (inactivity) release timer.

Solutions are now being investigated in 3GPP SA2 to reduce the high frequency of signalling procedures, e.g. RRC signalling, paging/service request procedures, caused by bursty data transmissions or frequent UE state transitions.

S2-122787 (NEC, 3GPP SA2#92) proposed to monitor the traffic of the user (using a monitoring client in the UE and a monitoring server in the PLMN) to learn the traffic patterns of the user, store them in the HSS and re-use them to optimize the user inactivity timer used in the RAN. But the solution based on determination of individual application traffic patterns is complex to design & deploy, requires UE changes (traffic monitoring client in the UE) and thus cannot be used with legacy terminals, and further contribute to load the radio and core network by requiring the UE to send extra traffic to the monitoring server in the PLMN and requiring the latter to upload the traffic patterns in the HSS.

Other solutions are being studied to minimize the number of keep-alive messages the terminal sends e.g. by coordinating keep-alive messages across all the applications running on the UE or by delegating some keep-alive control to the network. Although this will help reducing the frequency of bursty data transmission for some applications, this will not help for frequent bursty data transmissions caused for other reasons e.g. status updates, user location updates, presence information updates.

Embodiments of the present invention in particular enable to avoid such drawbacks or solve such problems.

In an embodiment, the Packet Switched Core Network (and in particular the Mobility Management Control entities i.e. MME and SGSN) can provide assistance information to the radio access network (eNB for E-UTRAN and RNC for UTRAN) based on the learning of the traffic pattern (e.g. time between successive signaling connections, mobile originated or/and mobile terminated traffic) and/or mobility pattern (e.g. static/nomadic vs moving user) of the user and/or user's subscription parameters (e.g. static/nomadic user), that enables the RAN to adjust/optimize the RAN parameters (DRX cycle, RRC user inactivity timer) applied to the user and thus reduce the frequency of transitions between idle and connected states, minimize network signaling and save UE battery.

In an embodiment, the Mobility Management Control entities (i.e. MME and SGSN) are well aware of when signaling connections are established and released with the UE/RAN and can make use of this to monitor e.g.
  the time elapsed between the release of the last signaling connection and the establishment of the subsequent signaling connection. A short duration (e.g. a few seconds) would be an incentive for the RAN to increase the RRC user inactivity timer;
  the frequency of transitions between idle and connected modes, and detect offending UEs with abnormally frequent transitions;
  whether or how frequently the traffic originates from the UE or/and the network, e.g. whether this is an UE that only or mainly utilize mobile originated communications. UEs with Mobile originated only traffic or Infrequent mobile terminated traffic could be configured e.g. with a longer DRX period to minimize battery usage (since this would not add the adverse effect of adding latency for delivery of mobile terminated traffic).

In an embodiment, the MME and SGSN can subsequently use these informations to pass information assisting the RAN (eNB or RNC) to optimize RAN parameters and in particular the DRX cycle (i.e. period of discontinuous reception when the UE is in connected state) and the user inactivity timer used in the RAN to release the RRC signaling connection of the user, e.g. during the setup of the subsequent signaling connection (e.g. in the S1-AP Initial Context Setup Request sent to the eNB).

In an embodiment, the RAN may additionally transfer assistance information to the MME or SGSN during the release of the signaling connection (e.g. in the UE Context Release Complete message sent by the eNB to the MME) e.g. the value of the RRC user inactivity timer applied for the signaling connection being released, for subsequent use during the setup of the next signaling connection of the user.

Following steps are illustrated in the example of FIG. 3:
  On-going signalling connection between UE and MME via eNodeB,
  Expiry of RRC user Inactivity Timer in eNodeB,
  Message "S1-AP S1 UE Context Release Request" sent by eNodeB to MME, containing a user inactivity cause,
  Message "S1-AP S1 UE Context Release Command" sent by MME to eNodeB,
  Message RRC Connection Release sent by eNodeB to UE,
  Message "S1-AP S1 UE Context Release Complete" sent by eNodeB to MME, containing RAN assistance data for next signalling connection,
  MME stores date/time of S1 connection release and RAN assistance data,
  New small data available for transmission in UE,
  Message "NAS Service Request" sent by UE to MME,
  MME detects frequent transitions between idle and connected states and notifies so to the eNB,
  Message "S1-AP S1 Initial Context Setup Request" sent by MME to eNodeB, containing RAN assistance data and CN assistance data,
  Radio Bearer Establishment between UE and eNodeB,
  Message "S1-AP S1 UE Initial Context Setup Complete" sent by eNodeB to MME,
  eNB adjusts the RRC user inactivity timer and DRX parameters to reduce idle-connected transition frequency and optimize battery usage.

In an embodiment, the MME/SGSN can also monitor the mobility pattern of the user, e.g. by monitoring mobility events (such as handovers, Tracking/Routing Area updates) over time, or thanks to possibly new subscription data (e.g. flagging a static or nomadic user). The MME/SGSN can also use these informations to complement the assistance information passed to the RAN (eNB or RNC), e.g. enabling the eNB to increase the duration during which it maintains a RRC signaling connection w/o user activity for a static or nomadic user (as a handover would be quite unlikely to happen for such a user).

In an embodiment, the MME/SGSN learn the traffic and/or mobility patterns of the user while the user is attached to the network. To minimize impacts in the PS core network, the learned patterns would not be forwarded to the new PS CN node (i.e. MME or SGSN) during inter-CN node mobility, nor stored in the HSS.

Embodiments of the present invention do not require any change in terminals, and are therefore usable with all UEs. Embodiments of the present invention require minimum changes to MME/SGSN while providing potential for large network signaling and UE power battery savings. Embodiments of the present invention do not cause any extra traffic load in the network just for the purpose of learning the user's traffic patterns.

Embodiments of the present invention may be extended with other examples of assistance information. Although it is preferred to rely only on the Mobility Management Control entities, embodiments of the present invention could possibly be extended with assistance information monitored in other PS CN nodes, e.g. the SGW (i.e. anchor point of all the PDN connections of the user under 3gpp access) or PGW, in which case the information would be passed to the RAN either directly e.g. via GTP-U extension headers or via the MME/SGSN (and S11/S4 signalling). The assistance information could then possibly cover e.g. the application type (detected in PGW), inter-packet arrival time (detected in PGW or SGW) . . . .

Embodiments of the present invention provide a generic solution for all kinds of applications, simple to implement & deploy, usable with all UEs (i.e. including legacy smartphones), with the potential of significant network signaling (in RAN and CN) and UE power battery savings.

In one aspect, there is provided a method for optimization of network signalling load and/or User Equipment power consumption in a packet mobile system wherein an User Equipment UE has access to a network comprising a Core Network CN accessed by a Radio Access Network RAN.

Various embodiments are provided, which may be taken alone or in combination, according to various combinations.

In an embodiment, CN assistance information is provided by said CN to said RAN for an UE, said CN assistance information including information determined in said CN based on a learning by said CN of a traffic pattern and/or a mobility pattern of said UE.

In an embodiment, CN assistance information provided by said CN to said RAN for an UE is used in said RAN to adjust RAN parameters enabling to control transitions between idle and connected state and/or power consumption in connected state for said UE.

In an embodiment, CN assistance information provided by said CN to said RAN for an UE includes information capable of indicating a potential of frequent transitions between idle and connected state for said UE, and/or information capable of indicating a potential of low or no mobility for said UE, and/or information capable of indicating a potential of mobile originated only traffic or infrequent mobile terminated traffic for said UE.

In an embodiment, RAN assistance information is provided by said RAN to said CN for an UE.

In an embodiment, RAN assistance information provided by said RAN to said CN for an UE includes a current value of RAN parameters enabling to control transitions between idle and connected state and/or power consumption in connected state for said UE.

In an embodiment, RAN assistance information provided by said RAN to said CN for an UE is used in said CN to assist in determining CN assistance information.

In an embodiment, RAN parameters enabling to control transitions between idle and connected state and/or power consumption in connected state for an UE include at least one of: an RRC Inactivity Timer, and a DRX Cycle.

In an embodiment, CN assistance information provided by said CN to said RAN for an UE and indicating a potential of frequent transitions between idle and connected state for said UE, and/or a potential of low or no mobility for said UE and/or a potential of mobile originated only traffic or infrequent mobile terminated traffic, is used in said RAN to increase an RRC Inactivity Timer and/or a DRX cycle for said UE.

In an embodiment, said method comprises:
a CN entity in charge of control plane learning a traffic pattern of an UE by monitoring establishment and release of signalling connections for said UE.

In an embodiment, said method comprises:
a CN entity in charge of control plane learning a traffic pattern of an UE by monitoring the time elapsed between the release of a last signalling connection and the establishment of a subsequent signalling connection for said UE.

In an embodiment, said method comprises:
a CN entity in charge of control plane learning a traffic pattern of an UE by detecting frequent transitions between idle and connected states for said UE.

In an embodiment, said method comprises:
a CN entity in charge of control plane learning a traffic pattern of an UE by monitoring whether or how frequently traffic originates from the UE or/and the network.

In an embodiment, said method comprises:
a CN entity in charge of control plane learning a traffic pattern of an UE by detecting UE that only or mainly utilizes mobile originated communications.

In an embodiment, said method comprises:
a CN entity in charge of user plane learning a traffic pattern of an UE by detecting an application type used by said UE.

In an embodiment, said method comprises:
a CN entity in charge of user plane learning a traffic pattern of an UE by detecting inter-packet arrival time for said UE.

In an embodiment, said method comprises:
a CN entity in charge of control plane learning a mobility pattern of an UE by monitoring mobility events for said UE over time.

In an embodiment, said method comprises:
a CN entity in charge of control plane learning a mobility pattern of an UE based on subscription data indicating a mobility profile of said UE, such as static or nomadic user.

In an embodiment, said method comprises:
a CN entity in charge of control plane notifying CN assistance information for an UE to a RAN entity.

In an embodiment, said method comprises:
a CN entity in charge of control plane notifying to a RAN entity CN assistance information for an UE and RAN assistance information previously received by said CN entity from a last RAN entity for said UE.

In an embodiment, said method comprises:
a CN entity in charge of control plane notifying CN assistance information for an UE to a RAN entity in a message sent during a Service Request procedure for said UE, such as in S1-AP S1 Initial Context Setup Request sent by MME to eNB in EPS.

In an embodiment, said method comprises:
a CN entity in charge of control plane notifying to a RAN entity CN assistance information for an UE and RAN assistance information previously received by said CN entity from a last RAN entity for said UE, in a message sent during a Service Request procedure for said UE, such as in S1-AP S1 Initial Context Setup Request sent by MME to eNB in EPS.

In an embodiment, said method comprises:

a RAN entity, notified of CN assistance information for an UE, adjusting RAN parameters enabling to control transitions between idle and connected state and/or power consumption in connected state for said UE, based on said CN assistance information.

In an embodiment, said method comprises:

a RAN entity, notified of CN assistance information and RAN assistance information for an UE, adjusting RAN parameters enabling to control transitions between idle and connected state and/or power consumption in connected state for said UE, based on said CN assistance and RAN assistance information.

In an embodiment, said method comprises:

a RAN entity notifying RAN assistance information for an UE to a CN entity in charge of control plane.

In an embodiment, said method comprises:

a RAN entity notifying RAN assistance information for an UE to a CN entity in charge of control plane, in a message sent during a signalling connection release procedure for said UE, such as in S1-AP S1 UE Context Release Complete sent by eNB to MME in EPS.

In other aspects, there are provided entities configured for carrying out such method, said entities including in particular (though not exclusively), RAN entity (such as eNB for E-UTRAN, or RNC for UMTS), CN entity in charge of control plane (such as MME for EPC, or SGSN for UMTS), CN entity in charge of user plane (such as Serving Gateway S-GW or PDN Gateway P-GW for EPC, or GGSN for UMTS).

A person of skill in the art would readily recognize that steps of various above-described methods can be performed by programmed computers. Herein, some embodiments are also intended to cover program storage devices, e.g., digital data storage media, which are machine or computer readable and encode machine-executable or computer-executable programs of instructions, wherein said instructions perform some or all of the steps of said above-described methods. The program storage devices may be, e.g., digital memories, magnetic storage media such as a magnetic disks and magnetic tapes, hard drives, or optically readable digital data storage media. The embodiments are also intended to cover computers programmed to perform said steps of the above-described methods.

The invention claimed is:

1. A method in a packet mobile system, the method comprising: an apparatus providing to a radio access network entity, for a user equipment, core network assistance information based on a learning of a traffic pattern and/or a mobility pattern and/or on subscription information of a user, wherein said core network assistance information comprises information allowing said radio access network entity to adjust at least one radio access network parameter to control user equipment state transitions.

2. The method according to claim 1, wherein said core network assistance information is provided by said apparatus to said radio access network entity during the setup of a signalling connection for said user equipment.

3. The method according to claim 1, wherein said core network assistance information comprises information determined in said apparatus based on a learning of a traffic pattern of said user equipment, wherein said learning comprises monitoring establishment and release of signalling connections for said user equipment.

4. The method according to claim 1, wherein said core network assistance information comprises information determined in said apparatus based on a learning of a traffic pattern of said user equipment, wherein said learning comprises monitoring the time elapsed between the release of a last signalling connection and the establishment of a subsequent signalling for said user equipment.

5. The method according to claim 1, wherein said core network assistance information comprises information determined in said apparatus based on a learning of a traffic pattern of said user equipment, said learning comprises detecting frequent transitions between idle and connected states for said user equipment.

6. The method according to claim 1, wherein said core network assistance information comprises information determined in said apparatus based on a learning of a mobility pattern of said user equipment, said learning comprises monitoring mobility events for said user equipment over time.

7. The method according to claim 6, wherein:
said mobility events comprises handovers.

8. The method according to claim 1, wherein said core network assistance information includes information determined in said apparatus based on a learning of a mobility pattern of said user equipment, wherein said learning is based on subscription data indicating a mobility profile of said user equipment.

9. The method according to claim 1, comprising:
said apparatus notifying to said radio access network entity said core network assistance information for said user equipment.

10. The method according to claim 1, comprising: said radio access network entity, notified by said apparatus of core network assistance information, adjusting said a least one radio access network parameters based on said core network assistance information.

11. The method according to claim 1, comprising: said apparatus providing said core network assistance information to said radio access network entity.

12. The method according to claim 1, wherein said core network assistance information is provided by said apparatus to said radio access network entity in an initial context setup request message.

13. An apparatus, comprising:
at least one processor; and
at least one memory including computer program code;
the at least one memory and the computer program code configured to, with the at least one processor, cause the apparatus at least to perform:
providing to a radio access network entity, for a user equipment, core network assistance information based on a learning of a traffic pattern and/or a mobility pattern and/or on subscription information of a user, wherein said core network assistance information comprises information allowing said radio access network entity to adjust at least one radio access network parameter to control user equipment state transitions.

14. The apparatus according to claim 13, wherein the at least one memory and the computer program code are configured to, with the at least one processor, cause the apparatus to perform:
providing said core network assistance information to said radio access network entity during the setup of a signalling connection for said user equipment.

15. The apparatus according to claim 13, wherein the at least one memory and the computer program code are configured to, with the at least one processor, cause the apparatus to perform:
providing said core network assistance information to a radio access network entity, in a message sent during a service request procedure for said user equipment.

16. The apparatus according to claim 13, wherein the at least one memory and the computer program code are configured to, with the at least one processor, cause the apparatus to perform:
providing said core network assistance information to said radio access network entity in an initial context setup request message.

17. An apparatus, comprising:
at least one processor; and
at least one memory including computer program code;
the at least one memory and the computer program code configured to, with the at least one processor, cause the apparatus at least to perform:
receiving core network assistance information for a user equipment from a core network entity based on a learning of a traffic pattern and/or a mobility pattern and/or on subscription information of a user, wherein said core network assistance information comprises information allowing said apparatus to adjust at least one radio access network parameter to control user equipment state transitions;
using said core network assistance information to adjust said at least one radio access network parameter for said user equipment.

18. The apparatus according to claim 17, wherein the at least one memory and the computer program code are configured to, with the at least one processor, cause the apparatus to perform: receiving said core network assistance information from said core network entity during the setup of a signalling connection for said user equipment.

19. The apparatus according to claim 17, wherein the at least one memory and the computer program code are configured to, with the at least one processor, cause the apparatus to perform: receiving said core network assistance information from a core network entity during a service request procedure for said user equipment.

20. The apparatus according to claim 17, wherein the at least one memory and the computer program code are configured to, with the at least one processor, cause the apparatus to perform: receiving said core network assistance information from said apparatus in an initial context setup request message.

* * * * *